Figure 1:
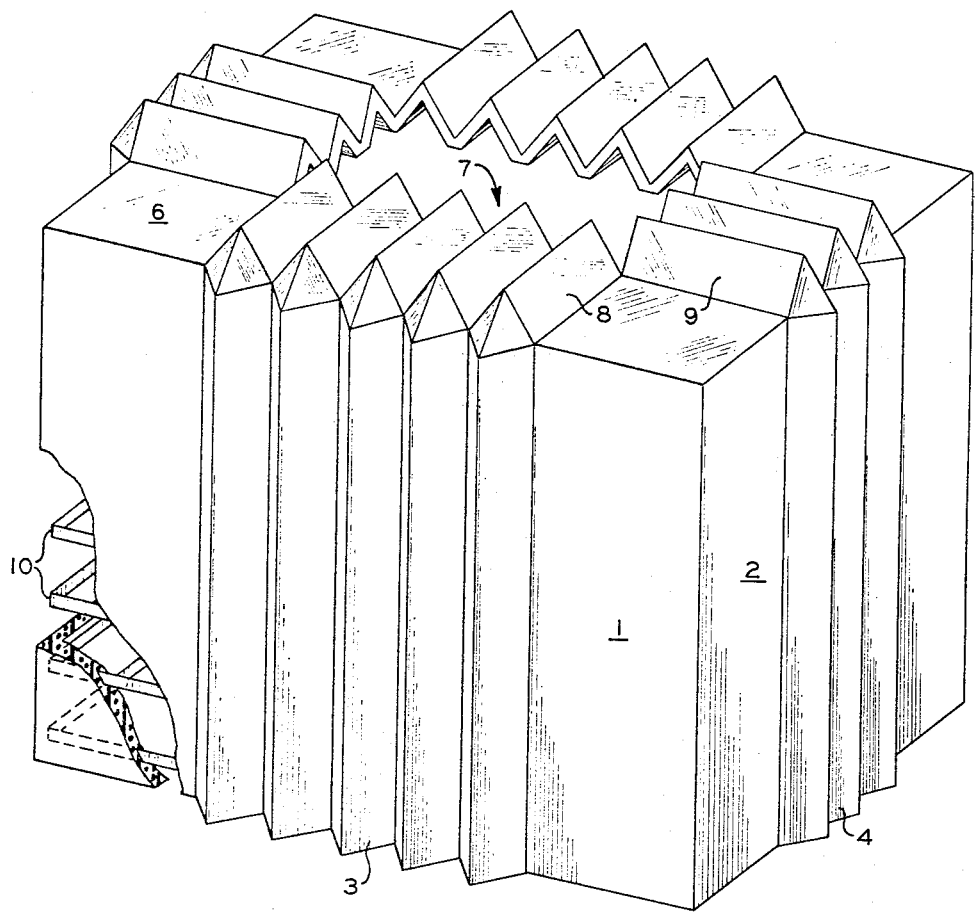

Oct. 29, 1968     O. E. RIRIE, JR     3,408,234

ADJUSTABLE JACKET FOR STORAGE BATTERIES

Filed Oct. 24, 1966     2 Sheets-Sheet 1

INVENTOR.
O. E. RIRIE, JR

BY *Young and Quigg*

ATTORNEYS

Oct. 29, 1968  O. E. RIRIE, JR  3,408,234
ADJUSTABLE JACKET FOR STORAGE BATTERIES
Filed Oct. 24, 1966  2 Sheets-Sheet 2

INVENTOR.
O. E. RIRIE, JR
BY
*Young and Quigg*
ATTORNEYS

United States Patent Office 3,408,234
Patented Oct. 29, 1968

3,408,234
ADJUSTABLE JACKET FOR STORAGE BATTERIES
Otis E. Ririe, Jr., Bartlesville, Okla., assignor to Phillips Petroleum Company, a corporation of Delaware
Filed Oct. 24, 1966, Ser. No. 588,792
7 Claims. (Cl. 136—181)

This invention relates to storage battery containers. In one aspect, this invention relates to insulating jackets for storage batteries. In another aspect, this invention relates to storage battery jackets which can be adjusted to accommodate different size batteries.

As a general rule, storage batteries perform most efficiently for longer periods of time when they are maintained under conditions of minor temperature variation. The problem of preventing automobile batteries and the like from freezing up or from becoming too hot, as the case may be, is particularly difficult to solve because of the wide variations in temperature to which a battery of this type is subjected. While attempts have been made to fabricate insulated containers for holding storage batteries, none of the prior art battery covers have proven successful, at least on a commercial scale, because of the many different size storage batteries in use and the resulting large inventories which must be maintained by a retailer in order to satisfy customer demands. Another shortcoming of the prior art storage battery containers is the amount of work involved to properly install them in a vehicle.

According to this invention, these and other disadvantages of the prior art storage battery containers are overcome by means of a storage battery jacket which is easily fabricated, inexpensive to manufacture, provides very good insulation from the heat and the cold, and requires very little effort to install in a vehicle.

The storage battery jacket of this invention is of generally rectangular shape and is constructed of an insulated flexible material. The jacket comprises a first pair of opposed side walls having pleats therein to allow the jacket to be adjusted to accommodate different size batteries, a second pair of opposed side walls attached to the first pair of side walls to form the generally rectangular shape jacket, and a cover which can be attached to one or more of the walls or which can be removable. The cover can be carried by at least one of the walls and is provided with a pleat to allow it to be adjusted as the walls are adjusted to accommodate different size batteries. The adjustable feature of the battery jacket of this invention allows the jacket to be adapted for use on many different size batteries.

In a modification of the invention, one or more electrical resistance heating elements can be molded or otherwise disposed within the walls of the storage battery jacket. The resistance element can be attached to a source of electrical power such as the battery itself to supply heat to the battery when the jacket is in use.

In another embodiment of the invention, the second pair of opposed side walls can be provided with one or more pleats each. This feature will allow the jacket to be extended or compressed in two different directions. When the storage battery jacket is provided with pleats in both the first and second pair of opposed side walls, the cover is provided with at least one pleat in each plane congruent with each of the planes of the pleats in the first and second pair of opposed side walls. This will allow the cover to be adjusted to correspond to the dimensions of the battery jacket.

As an optional feature of the invention, the cover can be formed integral with the walls. The cover can also be formed separately so that it can be removed from the top of the battery.

Figure 2:
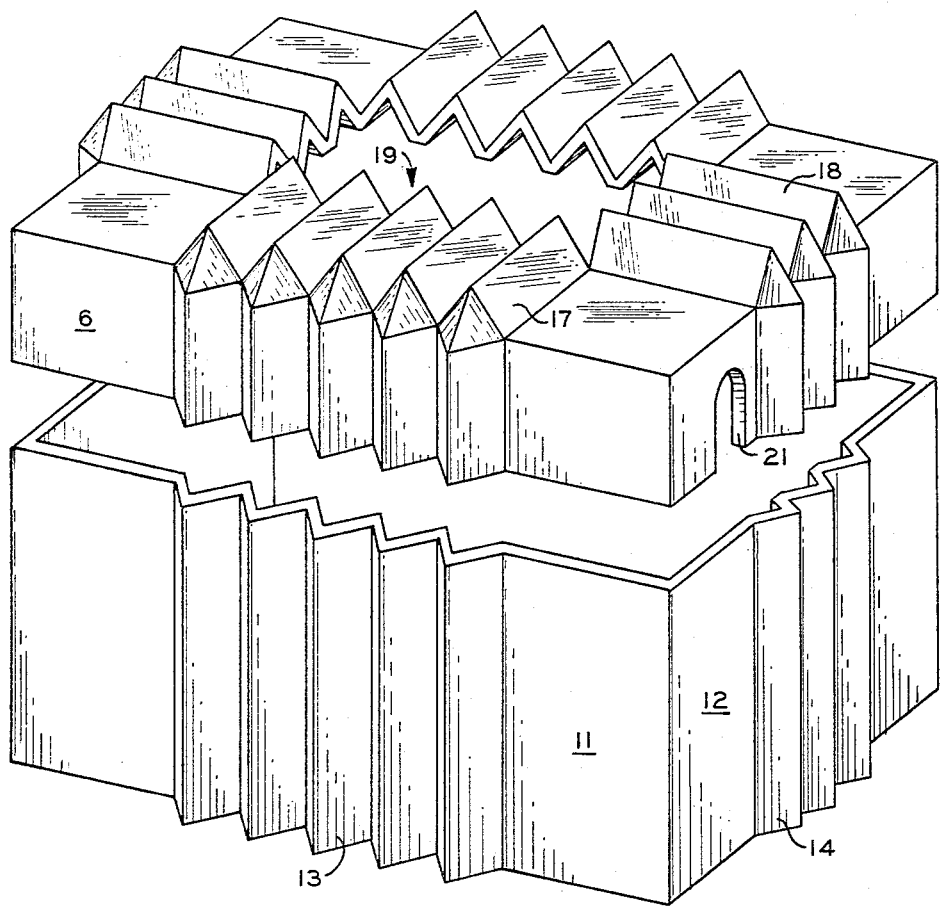

Accordingly, it is an object of this invention to insulate storage batteries from temperature changes. Another object of this invention is to provide a storage battery jacket which can be adjusted to accommodate different size batteries. A further object of this invention is to provide a storage battery jacket which is light weight in construction, inexpensive to manufacture, and simple to use. These and other objects of the invention will become apparent to one skilled in the art after studying the following detailed description, the appended claims, and the accompanying drawings wherein:

FIGURE 1 is a perspective view of a storage battery jacket constructed according to one embodiment of the invention; and FIGURE 2 is a perspective view of a storage battery jacket with a removable cover constructed in accordance with another embodiment of the invention.

Referring now to the battery jacket illustrated in FIGURE 1, the invention will be described in more detail. The battery jacket illustrated includes a side wall 1 of a first pair of opposed side walls and another side wall 2 of a second pair of opposed side walls. Each of the side walls 1 and 2 is provided with pleats 3 and 4, respectively. While the storage battery jacket is illustrated as having pleats in both side walls 1 and 2, it is within the spirit and scope of the invention to employ one or more pleats in only one of the opposed side walls. In this modification of the invention, the battery cover will be adjustable in one direction only.

A cover 6 is carried by side walls 1 and 2. An opening 7 in the cover 6 can be used to afford access to a battery when the jacket is in use.

The cover 6 is provided with pleats 8 and 9 in a plane congruent with the plane of pleats 3 and 4, respectively. When only one pair of opposed side walls is fashioned with pleats, the cover 6 is provided with one or more pleats on only one plane which is congruent with the plane of the pleats in the pair of opposed side walls. This will allow the cover to be adjusted with the one pair of opposed walls of the battery jacket.

While the cover 6 is illustrated as being integral with the opposed side walls 1 and 2, it is within the spirit and scope of the invention to attach the cover 6 to only one of the side walls as by hinges or the like. This will allow the cover to be raised by rotating it about the edge to which it is attached to the side wall.

An electrical resistance heating element 10 disposed within the walls of the jacket can be used to supply heat to a battery when the jacket is in use. The heating elements are provided with suitable leads (not shown) for connection to a source of electrical power.

In the modification illustrated by FIGURE 2 of the drawings, wall 11 of the first pair of opposed side walls is attached to wall 12 of the second pair of opposed side walls. Side walls 11 and 12 of the first and second pairs of opposed side walls are provided with pleats 13 and 14, respectively. While the storage battery jacket of FIGURE 2 is illustrated with pleats in both pairs of opposed side walls, it is within the spirit and scope of the invention to eliminate the pleats in one of the pairs of opposed side walls. In this modification of the invention, the storage battery jacket can be adjusted in one direction only.

In the embodiment illustrated by FIGURE 2, the cover 6 is separate such that it can be removed. The cover 6 is removably supported by at least one of the side walls of the jacket. The removable cover 6 is provided with pleats 17 and 18 which function in a manner similar to the pleats 13 and 14 to allow the cover 6 to be adjusted to accommodate different size batteries. The cover is provided with an opening 19 which will afford access to the battery. A cutout portion 21 in cover 6 will accommodate a battery cable when the cover is in use.

While not shown in the jacket illustrated by FIGURE 2, the walls 11 and 12 and top 6 can be provided with electrical resistance heating elements which will allow heat to be supplied to the battery.

The storage battery jacket of this invention can be fashioned from any suitable insulating material. Flexible materials which can be used include polystyrene, polyurethane, and copolymers of ethylene, vinyl acetate, and polyvinylchloride. Foamed materials of the foregoing plastics can also be used.

Colors, pigments, dyes, and fillers can also be incorporated into the materials used for fabricating the flexible battery jacket if desired.

In some installations it may be desirable to wrap a storage battery with an electrical resistance heating element before the jacket is placed over the battery. This modification is within the spirit and scope of the invention.

Although the invention has been described in considerable detail, it must be understood that such detail is for the purpose of illustration only and that many variations and modifications can be made without departing from the spirit and scope of the invention.

I claim:
1. A storage battery jacket of generally rectangular shape and constructed of an insulative, flexible material comprising a first pair of opposed side walls having pleats therein to allow said jacket to be adjusted to accommodate different size batteries; a second pair of opposed side walls attached to said first pair of side walls to form said generally rectangular shape jacket; and a cover carried by at least one of said first walls and said second walls, said cover having a pleat to allow said cover to be adjusted to accommodate different size batteries.

2. A storage battery jacket according to claim 1 wherein an electrical resistance heating element is disposed within the walls of said jacket for supplying heat to a storage battery when said jacket is in use.

3. A storage battery jacket according to claim 1 constructed of a foamed plastic material.

4. A storage battery jacket according to claim 1 wherein said cover is removably supported by at least one of said first walls and said second walls.

5. A storage battery jacket according to claim 1 wherein said second pair of opposed side walls is provided with pleats.

6. A storage battery jacket according to claim 5 wherein said cover is provided with a pleat in a plane congruent with the plane of the pleats in said second pair of opposed side walls.

7. A storage battery jacket according to claim 1 wherein said cover is attached to said first pair of opposed side walls and to said second pair of opposed side walls; and wherein said cover has an opening to afford access to a storage battery.

References Cited

UNITED STATES PATENTS 3,146,132 8/1964 Nathan _____ 136—181
3,302,358 2/1967 Jackson.

FOREIGN PATENTS 518,129 11/1955 Great Britain.
693,191 6/1953 Great Britain.

WINSTON A. DOUGLAS, *Primary Examiner.*

D. L. WALTON, *Assistant Examiner.*